United States Patent [19]

Latting et al.

[11] Patent Number: 5,679,128
[45] Date of Patent: Oct. 21, 1997

[54] DRY-BONDED NONIONIC ADJUVANTS

[76] Inventors: John Alvis Latting, 10107 Monrovia, Lenexa, Johnson County, Kans. 66215; Ivan Russell Wells, 16801 NE. 134th Ter., Kearney, Clay County, Mo. 64060; Brett Lee Randol, 1832 Waterfield Ct., Blue Springs, Jackson County, Mo. 64014

[21] Appl. No.: 381,581

[22] Filed: Jan. 31, 1995

[51] Int. Cl.$^6$ .................... C05C 3/00; C05G 3/06
[52] U.S. Cl. ................... 71/49; 71/60; 71/64.07; 71/64.11; 427/422
[58] Field of Search ............. 71/64.07, 64.11, 71/64.61, DIG. 1, 54, 60, 49, 53; 427/422; 502/189, 281, 313, 326, 334, 349, 359

[56] References Cited

U.S. PATENT DOCUMENTS

| | | | |
|---|---|---|---|
| 5,211,985 | 5/1993 | Shirley et al. | 427/213 |
| 5,258,132 | 11/1993 | Kamel et al. | 252/94 |

FOREIGN PATENT DOCUMENTS

| | | |
|---|---|---|
| 501798 | 2/1992 | European Pat. Off. . |
| 59-182287 | 10/1984 | Japan . |

OTHER PUBLICATIONS

Weed Technology (1993) vol. 7:633–640 Green & Green No Month.

Pesticide Science (1993) vol. 38: 77–84 Nalewaja & Matysiak No Month.

Adjuvants & Agrochemicals vol. II Chapter 34, 139–148 No Month.

King et al., Adjuvants effects on the Delivery of Dicamba and its Salts, Pestic Science, pp.263–266 no mt/93.

*Primary Examiner*—Ferris Lander

[57] ABSTRACT

A method for producing a dry bonded solid nonionic surfactant/fertilizer adjuvant system comprising spray-coating dry water-soluble, nitrogen-containing fertilizer particles, preferably diammonium sulfate with the surfactant composition and the coated compositions produced thereby.

13 Claims, No Drawings

DRY-BONDED NONIONIC ADJUVANTS

FIELD OF THE INVENTION

The present invention relates to solid, nonionic surfactant coated, water-soluble fertilizer delivery systems.

BACKGROUND OF THE INVENTION

Many pesticides, for example, fungicides, plant growth regulators, herbicides and systemic insecticides or, in fact, any pesticide needing rain fastness or attendant soil or surface wetting/penetration require the presence of surfactant adjuvants for effective end-use applications. This is especially true for herbicides which realize greatly enhanced post-emergence weed control when applied with certain nonionic surfactants. For example, studies such as "Surfactant Structure and Concentration Strongly Affect Rimsulfuron Activity" Green et al., Weed Technology Vol. 7:633-640, 1993 have indicated that sulfonyl urea herbicidal activity can be increased ten-fold with selection of appropriate nonionic surfactant adjuvants. The art has also recognized the particular importance of two of the adjuvant properties. They are first, the hydrophilic—hydrophobic balance (HLB) and secondly, the physical form of the initial surface deposit, ideally a moist gel. It has been theorized that with surfactants in the appropriate HLB range, the surfactant is hydrophilic enough to solubilize the herbicide in water and lipophilic enough to penetrate the cuticle of a leaf. In moist gels, the surfactants are hypothesized to form monolayers on the leaf surfaces with the lipophilic portion along the waxes and the hydrophilic portion forming "hydrophilic channels" through surface imperfections such as cracks, punctures, and pores. These channels absorb water and slightly swell to allow herbicides to diffuse through the cuticle into the cell walls.

The surfactants preferred by the art and which can realize the above-described properties when admixed with pesticides in aqueous medium, are the nonionics. Most preferably, the solid, nonionic surfactants are desired by the end-user, usually a farmer, for ease of handling such as when preparing a pesticidal spray tank mix. The solid nonionics are also preferred to eliminate the need for triple rinsing of the liquid surfactant containers, e.g., the 2.5 gallon jugs, usually used to deliver liquid surfactant concentrates to farmers and to avoid the attendant jug disposal problem. However, solid nonionic surfactants tend to dissolve rather slowly; therefore, end-users must be especially careful to ensure complete dissolution of the surfactant so that proper pesticide to surfactant ratios are delivered to the locus and/or that entrained undissolved particles do not interrupt the delivery process, e.g., by plugging spray nozzles.

Often dry water-soluble nitrogen fertilizers such as urea, ethylurea, mono and diammonium phosphate; mono and diammonium sulfate, and mixtures thereof can enhance the efficacy of pesticides, especially the herbicides. This significant increase in herbicide phytotoxicity in the presence of nitrogen fertilizers has been especially observed with the use of diammonium sulfate adjuvant. Large increases in herbicidal efficacy have been reported (Adjuvants and Agrochemicals, Vol. II, Chapter 34) when diammonium sulfate was used as an adjuvant in combination with methylated seed oil, a known cuticle "softener". Glyphosate, one of the most frequently used herbicides worldwide, usually has diammonium sulfate added to its spray tank solution to enhance its herbicidal efficacy. As an aside, diammonium sulfate appears to have at least two modes of action when coupled to glyphosates: firstly, by directly increasing the glyphosates phytotoxicity and secondly, by overcoming antagonism from certain cations. It has been theorized that the sulfate ions precipitate calcium and sodium ions by forming calcium and sodium sulfates which have low water solubility. The ammonium ions form the more toxic glyphosate-ammonium complex and prevent formation of the less phytotoxic glyphosate-sodium complex during droplet drying.

However, the delivery of a pesticide, the aforedescribed solid, nonionic surfactant composition and the dry water-soluble fertilizer components individually to the customer for on-site blending or tank mixing ofttimes results in an undesirable situation for the customer for he has to ensure that the amounts of the pesticide, surfactant composition and fertilizer inserted into the spray tank are correct; the materials are compatible and properly dispersed; proper safety precautions are followed, for example, if one or more of the components dust; and that necessary additional adjuvants are immediately available if, through incompatibility or otherwise, for example, problems with excessive foaming or precipitation were to occur. Even though all of the components are delivered as solids, a spill of a component delivered as a powder can also be exceedingly difficult to clean up.

In view of the above, suppliers to the agricultural market have attempted to pre-blend individual fertilizer, surfactant and other adjuvant components as an aid to the end-user farmer. However, significant differences in particle sizes among the individual components can result in separation during shipping and/or storage. Furthermore, inherent tackiness or particle fines generated through attrition can result in compaction and/or caking before the customer can use the product blend. In view of the slow aqueous dissolution rate exhibited by many of the solid nonionics, it would also be desirable to increase the rate at which the solid surfactant dissolves in the end-user's final liquid medium. Heretofore, attempts to control the times of solid surfactant solubilization have taken various forms, such as using incorporated binders, extrusion granulation, membrane encapsulation, or tableting, i.e., compression of the surfactant-containing compositions all of which possess attendant disadvantages. For example, encapsulation is highly dependent upon the quality of the encapsulating material and may release the compositions in discrete packages. The compaction process is an extremely difficult way to control the release of surfactant material for slight variations in composition properties, e.g., tackiness, particle size, etc. can have dramatic impact on the dissolution rate even under fixed, uniform compacting pressure.

Extrusion processing to prepare melt-admixed granules, such as is taught in EP 501,798A1 has the disadvantage of always intimately admixing all of the components thus inherently placing a restriction on the individual components that can be utilized in such a process. For example, in many situations, the individual components sought to be used are incompatible in intimate contact. Furthermore, in extruded granules, all of the material components will be exposed to the aqueous medium simultaneously, i.e., one cannot program for differing dissolution rates.

As noted above, however, granule-type products, i.e., multi-component particles are desirable in many end-use applications such as when they are to be used in pesticidal tank mixes for they are more stable during storage and transport than mere physical mixtures of the dry individual components and provide ease of handling.

It would be advantageous if a process means relatively insensitive to minor process or product variations were available to avoid the above-identified problems of the prior art; to provide a single particle fertilizer-nonionic surfactant carrier; and to perhaps not only increase the rate at which nonionic solid surfactants dissolve in aqueous medium, but also permit i) incompatible components to be incorporated into a single particle and ii) preferential or sequential exposure of selected components to the aqueous media.

For all of the above reasons, it would be highly desirable to be able to provide a dry solid granulated product comprising a water-soluble solid fertilizer and a solid, nonionic surfactant composition, which does not exhibit the undesirable traits associates with heretofore prior art blend attempts as detailed above.

SUMMARY OF THE INVENTION

It is an object of the present invention to realize a 20 process for preparing a dry water-soluble nitrogen fertilizer coated with solid nonionic surfactant compositions, and the resulting granule. This is accomplished by spray-coating the molten surfactant composition onto from 70 to about 99 weight percent dry water-soluble, nitrogen-containing fertilizer, preferably diammonium sulfate crystals, said percent based on the final weight of the dry bonded adjuvant granule.

DETAILED DESCRIPTION OF THE INVENTION

It has been discovered that dry water-soluble nitrogen-containing fertilizers, preferably diammonium sulfate can provide excellent substrates for certain solid nonionic surfactants when the surfactant composition is dry bonded onto from 70 to 99 weight percent (based on the total dry bonded particle weight) of the fertilizer by spray-coating the fertilizer with the molten surfactant. The time for complete dissolution in water of the solid, nonionic surfactant compositions can ofttimes be significantly reduced. These coated fertilizer carrier systems also realize many additional advantages over the blends of fertilizer and adjuvants in the prior art. At the outset, being a hard coated, granular type product, the instant fertilizer carrier systems are exceptionally stable and relatively unaffected by attrition during storage and shipping. These unique fertilizer delivery systems permit components, normally incompatible with the nitrogen-containing fertilizer to be physically adhered to the granule. If it is desired to have adjuvants that require a longer exposure time to a given aqueous medium for optimum efficiency as an inherent part of the granule, for example, guar particles that require additional hydration time; pH buffers, etc., they can be preferentially or sequentially released by not having the adjuvant incorporated uniformly throughout the particle as would occur using the processing of the prior art, but rather having the adjuvant adhered to the outer surfactant coating of the granule.

By "spray-coated" is meant that the solid surfactant is melted and coated upon the fertilizer while still in the molten state. This is done by spraying the molten surfactant onto the fertilizer, most preferably the diammonium sulfate particles in a coating blender. Complete coating of the fertilizer particles is not always necessary but, rather, the degree of completeness of the coating is often determined by specific requirements such as the need to isolate the fertilizer from other added incompatible adjuvants. The sprayed material, while still in a sticky state can optionally be continuously tumbled to partially agglomerate or granulate the individual particles so as to yield dry bonded flowable granules.

The solid, nonionic surfactants that can be used in the process of this invention are those known in the art which are solid or of a hard, nontacky wax consistency at room temperature.

Among the preferred nonionics are the following:

A) Amides such as:
i) Alkanolamides of the formula

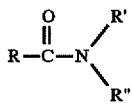

wherein R' and R" each can be —H, —CH$_2$CH$_2$OH, or

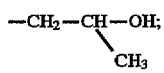

i) ethoxylated alkanolamides of the formula

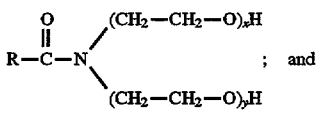   ; and iii) ethylene bisamides of the formula

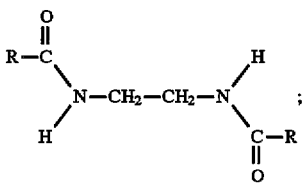

B) Esters such as:
i) fatty acid esters of the formula

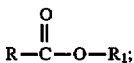

ii) glycerol esters of the formula

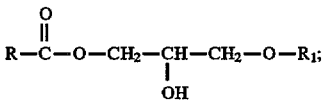

iii) ethoxylated fatty acid esters of the formula

iv) sorbitan esters of the formula

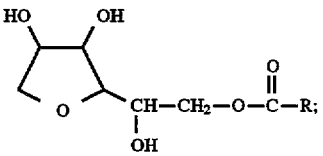

v) ethoxylated sorbitan esters of the formula

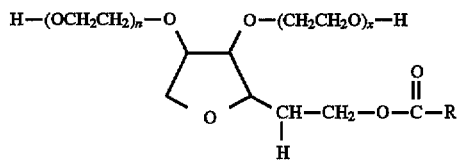

c) Ethoxylates such as:
i) alkylphenol ethoxylates of the formula

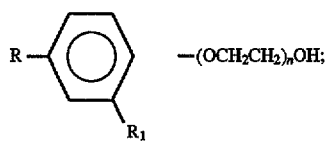

ii) alcohol ethoxylates of the formula

iii) tristyrylphenol ethoxylates of the formula

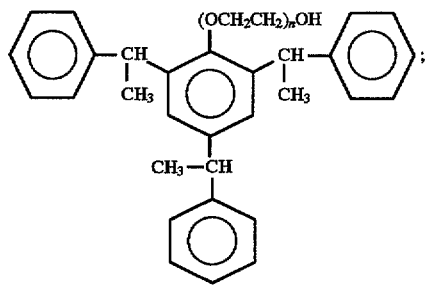

iv) mercaptan ethoxylates of the formula

D) End-capped and EO/PO block copolymers such as
i) alcohol alkoxylates of the formula

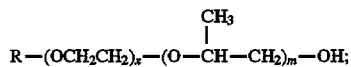

ii) ethylene oxide/propylene oxide block copolymers of the formula

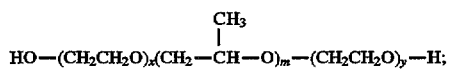

iii) copolymers of the formula

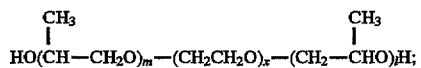

iv) chlorine capped ethoxylates of the formula

 and v) tetra-functional block copolymers of the formula

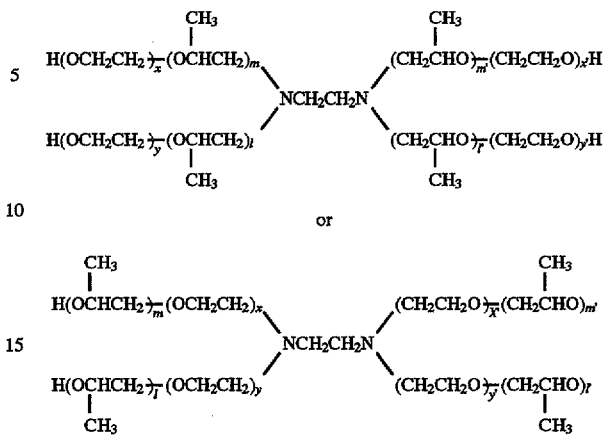

wherein
R is a fatty alkyl group, preferably a $C_6$–$C_{22}$ fatty alkyl group, most preferably a $C_8$–$C_{18}$ fatty alkyl group;

$R_1$ is —H or a fatty alkyl group, preferably —H or a $C_6$–$C_{22}$ fatty alkyl group, most preferably —H or a $C_8$–$C_{18}$ fatty alkyl group;

x, x', y, y' and n are each independently moles of ethylene oxide preferably 1 to 300; most preferably 1 to 150; and m, m', l and l' are each independently moles of propylene oxide, preferably 1 to 300; most preferably 1 to 150;

with the proviso that the surfactant is a solid at room temperature (24° C.), preferably a solid at 50° C.

Mixtures of the above surfactants are acceptable and, in fact, mixtures of the above surfactants with other nonionics that alone are liquid even at room temperature may be acceptable provided that the amount or nature of the liquid surfactant is such that the final particulate product does not exhibit tackiness at room temperature. Preferably, tackiness is not exhibited even at 50° C.

The more preferred solid nonionic surfactants are the aforedescribed alkyl alcohol ethoxylates and alkylphenol ethoxylates.

The solid, nonionic surfactant composition of the instant granules should be from about 1 to 30 weight percent, preferably from about 4 to 30, based on the total weight of the granules.

The most preferred solid nonionic surfactant is dinonylphenol ethoxylate (>100 EO) for it has been discovered that this compound possesses the ability to provide excellent wetting characteristics together with a high melting point. Furthermore, the material exhibits an ability to dissolve in aqueous medium without formation of a gel phase.

The amount of the dry water-soluble nitrogen-containing fertilizer to be spray-coated by the solid nonionic composition can be from 70 to about 99 weight percent, preferably from 70 to about 96 weight percent based on the total weight of the final spray-coated composition.

The essence of the preferred embodiment of the instant invention lies in the discovery that if solid nonionic surfactant compositions are spray-coated upon dry, water-soluble nitrogen-containing fertilizers such as diammonium sulfate, the dissolution rate of the dry surfactant particulate composition in aqueous solution can be greatly enhanced. It is also hypothesized that in addition to the action of the fertilizer per se upon the dissolution rate of the solid, nonionic surfactant composition, the coating/granulation process tends to entrap air within the coated granules thereby increasing the surface area ultimately exposed to the aqueous medium which increases the dissolution rate (as opposed to compaction and extrusion processes which tend to compress air out of the particles). Also, the pockets of entrapped air function as flotation aids which assist in keeping the coated granules from settling.

The preferred process of the instant spray-coating invention comprises the steps of:

a) adding the dry water-soluble nitrogen-containing fertilizer, preferably diammonium sulfate to a blender chamber;

b) mixing said fertilizer to ensure uniform distribution;

c) melting the initially solid nonionic surfactant composition, preferably at a temperature of from about 65° to about 95° C. (149°–203° F.);

d) spraying the molten surfactant composition onto the fertilizer particles in said blender chamber with continuous blending to effect a coating and granulation of the fertilizer particles; and e) cooling the coated particles, preferably to less than 50° C. (122° F.).

Preferably, the fertilizer particles are initially blended for at least 10 minutes before the spraying step to ensure that the initial crystal or particle sizes are uniformly distributed throughout the batch. The preferred spray blender-mixers are those of the Mark VI design manufactured by Continental Rollo or an equivalent.

Also preferably, to aid in providing a uniform granulation, the mixture should continue to be blended for at least three additional minutes after the spraying has ceased. If it is desired to have any additional components adhere to the surface of the coated granules, e.g., if an additional additive is a fine powder and one desires to reduce dusting in the final product, the material can be added while the coated granules are still tacky to obtain adherence, i.e., the material can be added before the coated material is completely cooled. Examples of such optional additional components include anti-foam agents, flow agents, anti-caking agents, stabilizers, inert fillers, gas-generating agents, dyes, and/or any adjuvants particular to the specific end-use application of the resulting product. Optional adjuvants can be added from about 0 to about 20 weight percent of the granular composition. Inert ingredients can be added up to about 80 weight percent.

One of the distinct advantages of the instant spray-coated, i.e., multi-layered particle is that it frees the preparer from many of the restrictions normally imposed upon multi-component systems manufacturers. For example, additional adjuvant components which normally would be incompatible with the fertilizer, specifically the diammonium sulfate can be made a part of the coated granule by introducing the component after the coating process is essentially completed, but while the multi-layered material is still tacky so that the adjuvant can be adhered to the outer surface, i.e., the component would only be in contact with the nonionic composition layer.

Another advantage realized by this adherence contact procedure is that it allows material to be placed on the outside of the spray-coated granule, thus giving the adhered material preferential or advanced exposure to the aqueous media. Thus, one can also selectively sequence the exposure times of certain components of the granule.

The fertilizer of the instant process preferably should be of a coarse grade; most preferably 95 weight percent of the material should have an average particle size diameter of from about 200 to about 600 microns, i.e., 95 weight percent should pass through a 30 mesh (U. S. Standard) screen and not pass through a 70 mesh (U. S. Standard) screen. Elimination of fines is preferred to minimize compaction or agglomeration of the fertilizer particles during the coating process.

The granules may be used as is or, if preferred, screened to a desired particle size.

The following specific examples are further illustrative of the present invention, but it is understood that the invention is not limited thereto. All amounts of various ingredients are by weight or weight percent unless otherwise specified.

In all of the following Examples, the dissolution rates were determined as follows:

A calculated amount of product such that the surfactant weight remained at 2.0 grams is added into a 250 ml beaker filled with 98 ml of deionized water at room temperature while stirring with a magnetic stirrer set to a speed of about 30–50% full scale and a stopwatch started. When complete dissolution is observed, i.e., the solution becomes completely clear, the time is recorded.

EXAMPLES I–II

A flaked dinonylphenol ethoxylate (>100 EO) (sold under the Rhone-Poulenc trademark Igepal DM-970 FLK) is blended with a sufficient amount of a liquid isodecyl alcohol ethoxylate (4 EO) (sold under the Rhone-Poulenc trademark Rhodasurf DA-530) to produce a non-tacky, solid mixture with a 85:15 respectively weight ratio surfactant Composition A. Although the isodecyl alcohol ethoxylate has an adverse effect on the melting point of the solid dinonylphenol ethoxylated surfactant, its presence is useful for the improved wetting characteristic it provides, i.e., the lower surface tension realized in the final aqueous solution as a result of its incorporation.

At room temperature, dry diammonium sulfate is added to the dry Composition A prepared above in a Sigma Blade Mixer in a weight ratio of approximately 85:15 weight percent sulfate to surfactant. Blending is unable to be accomplished because the materials compress together and cake.

The test is run again utilizing solely the flaked dinonylphenol ethoxylate (>100 EO), i.e., Igepal DM-970 FLK in lieu of Composition A. Again, the blending is unsuccessful because, even at room temperature, the surfactant and diammonium sulfate compact to form cakes.

EXAMPLE III

Diammonium sulfate is charged into a Continental Rollo mixer Mark VI blender. The sulfate is rotationally blended for about 10 minutes. A solid nonionic surfactant composition comprising dinonylphenol ethoxylate (>100 EO) (Igepal DM 970) and isodecyl alcohol ethoxylate (4 EO) (Igepal DA 530) respectively, (said nonionic surfactant composition blend sold under the Rhone-Poulenc trademark AgRHô DS 420) is heated at a temperature of about 85° C. until the surfactant composition is melted. The molten surfactant is then sprayed onto the rotating diammonium sulfate through fine sized 8008E spray tips. The mixture is blended continuously for three additional minutes to ensure uniform granulation. The mixture is then cooled to about 45° C. at which time an antifoam agent, followed by citric acid and a flow aid is blended into the mixture for three minutes. The coated granular product is collected through a #8 (U.S.

Standard) mesh screen. In these and the following examples, the weight percentages as indicated are based on the total weight of the final granule formulation.

TABLE I

| Sample | Dinonylphenol Ethoxylate < (100 EO) Flaked | Isodecyl Alcohol Ethoxylate (4 EO) Liquid | Ammonium Sulfate | Antifoam Agent* | Dissolution Time (Min.) |
| --- | --- | --- | --- | --- | --- |
| Control | 85.00% | 15.00% | — | — | 4:25 |
| 1** | 20.77% | 3.60% | 74.00% | 0.07% | 1:07 |

*a polyorganosiloxane sold under the Rhone-Poulenc trademark Rhodorsil Silicone EP 6703
**1.30% citric acid and 0.26% flow aid (an amorphous precipitated silica sold under the Rhone-Poulenc Trademark Tixosil 38 AB) are added.

The resulting dissolution time of the solid nonionic surfactant composition indicates the significantly enhanced dissolution rates that can be unexpectedly realized by this invention, i.e., by the spray-coating of diammonium sulfate with the molten nonionic surfactant composition.

EXAMPLE IV 84.05 weight percent diammonium sulfate is charged into a Continental Rollo mixer Mark VI blender. The sulfate is rotationally blended for about 10 minutes. 15 weight percent of a solid nonionic surfactant composition comprising a 85:15 weight ratio of dinonylphenol ethoxylate (>100 EO) (Igepal DM 970) to isodecyl alcohol ethoxylate (4 EO) (Igepal DA 530) respectively, (said nonionic surfactant composition blend sold under the Rhone-Poulenc trademark AgRHô DS 420) is heated at a temperature of about 85° C. until the surfactant composition is melted. The molten surfactant is then sprayed onto the rotating ammonium sulfate through five sized 8008E spray tips. The mixture is blended continuously for three additional minutes to ensure uniform granulation. The mixture is then cooled to about 45° C. at which time 0.2 weight percent of antifoam Rhodorsil Silicone EP 6703 is blended into the mixture for three minutes. Lastly, 0.75 weight percent of an anti-caking or free flow aid (Tixosil 38AB) is blended in for a few minutes. The coated granular product is collected through a #8 mesh sieve.

The dissolution times of the resulting coated granules are less than half that of the solid nonionic surfactant composition alone.

EXAMPLE V

The process of Example IV is followed utilizing the following weight percentages: ammonium sulfate-93.15%; AgRHô DS 420-6.0%; Rhodorsil EP 6703-0.1%; and Tixosil 38 AB-0.75%.

As in Example IV, the dissolution times of the resulting coated granules are again less than half that of the solid nonionic surfactant compositions alone.

In addition to the above-identified advantages of potentially increased surfactant dissolution rates and the avoidance of compaction problems associated with attempts to intimately admix diammonium sulfate with the solid surfactants of the instant invention, the spray-admixed compositions of this invention do not suffer from particle separation that can occur with simple solid blends of the same materials.

In addition to the aforementioned enhanced dissolution; incompatibility avoidance; and preferential dissolution advantages, the coated products of this invention also realize a very uniform granule size together with excellent attrition resistance. Serendipitously, the process is significantly less energy intensive and more capital cost effective than other melt-admixing processes, e.g., the extrusion processes of the prior art.

EXAMPLEs VI–XIV

The following examples illustrate the enhanced phytotoxicity realized by the use of the dry bonded adjuvant systems of the instant invention compared to that realized by standard liquid adjuvants. The tests were undertaken in St. Marie, Ill. in mid-June of 1994 with average weather conditions of high humidity; full sun; and daytime temperature of 85° F. The carrier for the compositions listed in Table II below was water at ten gallons per acre.

Dry bonded Adjuvant A is the spray-coated composition of Example V. Kinetic (a trademark of Helena Chemical Co.) is a proprietary liquid surfactant adjuvant system comprising a polyorganosilicone and an ethyleneoxide/propyleneoxide block copolymer. Dynamic (a trademark of Helena Chemical Co.) is a proprietary liquid adjuvant system comprising methylated seed oil (MSO) and a polyorganosilicone. C.O.C. is a crop oil concentrate usually about 83 weight percent paraffinic crop oil and 17 weight percent emulsifier.

TABLE II

| Crop | Compounds | Rate per Acre | Phyto-toxicity (5 days) | % Control (22 days) | Days before Visual Activity |
| --- | --- | --- | --- | --- | --- |
| Corn | Adjuvant A | 2.50 lbs. | 0% | 100 | 5 |
|  | Beacon | .78 oz. |  |  |  |
|  | Accent | .78 oz. |  |  |  |
| Corn | Kinetic | 1.60 oz. | 0% | 95 | 10 |
|  | Beacon | .78 oz. |  |  |  |
|  | Accent | .78 oz. |  |  |  |
| Soybeans | 1. Adjuvant A | 2.50 lbs. | — | 100 | 2 |
|  | Pursuit | 4.00 oz. |  |  |  |
| Soybeans | Dynamic | 6.40 oz. | 0% | 95 | 10 |
|  | Pursuit | 4.00 oz. |  |  |  |
| Soybeans | 2. Adjuvant A | 2.50 lbs. | 2% | 100 | 3 |
|  | Classic | .33 oz. |  |  |  |
|  | Pinnacle | .25 oz. |  |  |  |
| Soybeans | Kinetic | 1.60 oz. | 15% | 95 | 5 |
|  | Classic | .66 oz. |  |  |  |
|  | Pinnacle | .66 oz. |  |  |  |
| Soybeans | 3. Adjuvant A | 2.50 lbs. | 0% | 100 | 2.5 |
|  | Poast Plus | 18.00 oz. |  |  |  |
| Soybeans | C.O.C. | 2.00 pts. | 0% | 95 | 14 |
|  | Poast Plus | 18.00 oz. |  |  |  |
| Soybeans | 4. Adjuvant A | 2.50 lbs. | 0% | 100 | 3 |
|  | Pursuit | 4.00 oz. |  |  |  |
|  | Butyrac 200 | 3.00 oz. |  |  |  |

TABLE II-continued

| Crop | Compounds | Rate per Acre | Phytotoxicity (5 days) | % Control (22 days) | Days before Visual Activity |
|------|-----------|---------------|------------------------|---------------------|------------------------------|

1. In combination with Adjuvant A there was an increase in activity in all Pursuit plots. Pursuit controlled all of the label weeds, plus had 100% control of shatter cane (12-14"), normally a suppression. Trumpet creeper was also suppressed.
2. There was little leaf burning with Adjuvant A in comparison to the Kinetic.
3. Increase activity of Poast Plus, seen on crabgrass, shatter cane and johnson grass, within 3 days.
4. There was no leaf burn, nor was there any antagonism with any of the herbicides.

Beacon is a trademark of Ciba Geigy for a sulfonyl urea formulation.
Accent, Classic and Pinnacle are trademarks of DuPont for sulfonyl urea formulations.
Pursuit is a trademark of American Cyanamid for an imidazoline formulation.
Poast Plus is a trademark of BASF for a proprietary cyclohexanedione formulation.
Butyrac 200 is a trademark for a 2,4 DB formulation sold by Rhone-Poulenc Inc.

The above results illustrate the significantly enhanced herbicidal activity realized via the use of the dry bonded adjuvant systems of the instant invention over the activity levels when standard liquid adjuvant systems are used.

EXAMPLES XV–XVI

The following examples illustrate the enhanced phytotoxicity realized with a glyphosate herbicide by the use of the dry bonded adjuvant system of the instant invention compared to that of a standard liquid adjuvant system. The tests were undertaken in St. Marie, Ill. in mid-June in 1994 with average weather conditions of high humidity; full sun; and a daytime temperature of 85° F. The carrier for the compositions listed on Table III below was water at ten gallons per acre. Dry bonded Adjuvant B is the spray-coated composition of Example IV. Roundup is a trademark of Monsanto for a glyphosate herbicidal formulation. Quest is a proprietary ammonia-based water conditioner of Helena Chemical CO.

TABLE III

| Compounds | Rate per Acre | % Control (22 days) | Days before Visual Activity |
|-----------|---------------|---------------------|------------------------------|
| 1. Roundup | 1.0 qt. | 100 | 5 |
| Adjuvant B | 2.0 lbs. | | |
| Roundup | 1.0 qt. | 90 | 10 |
| Quest | 3.2 oz. | | |
| Kinetic | 1.6 oz. | | |

1. Adjuvant B + Roundup had increased activity plus controlled the heavy infestation of nutsedge, which the Kinetic + Quest failed to do.

herbicidal activity achieved via the use of the dry bonded adjuvant systems of this invention when combined with a glyphosate herbicide. The outstanding activity of these dry bonded products are the result of the combined properties of high surfactant loadings; high ammonium ion levels; and rapid aqueous dispersement. These factors, together with the fact that 1) the HLB is about 16, i.e., within the art-recognized preferred range of 12–17 and 2) the compositions dry initially to a moist gel on leaf surfaces (an ideal condition as previously noted for increased pesticide leaf penetration) combine to make these dry bonded products powerful adjuvants for the pesticide end-user. Since the final granular product is such that it produces very little foam; low dust levels and odor; is non-compacting and spills are easily swept up, the dry bonded adjuvant system combines performance, convenience, and safety to the end-user—an ideal situation.

Although the present invention has been described and illustrated with reference to specific examples, it is understood that modifications and variations of composition and procedure are contemplated within the scope of the following claims:

We claim:

1. A method for producing a dry bonded adjuvant system comprising:

spray-coating dry water-soluble, nitrogen containing fertilizer with a molten, nonionic surfactant composition selected from the group consisting of:

i) alkanolimides of the formula

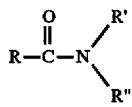

wherein R' and R" each can be —H, $$-CH_2-\underset{\underset{CH_3}{|}}{CH}-OH;$$

ii) ethoxylated alkanolamides of the formula

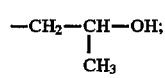

iii) ethylene bisamides of the formula

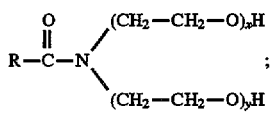

iv) fatty acid esters of the formula

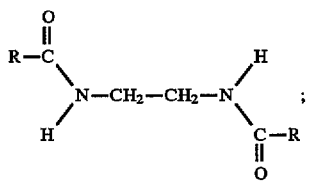

v) glycerol esters of the formula

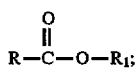

vi) ethoxylated fatty acid esters of the formula

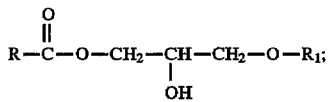

vii) sorbitan esters of the formula

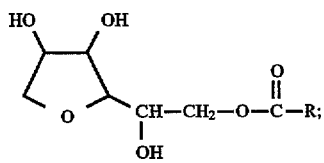

viii) ethoxylated sorbitan esters of the formula

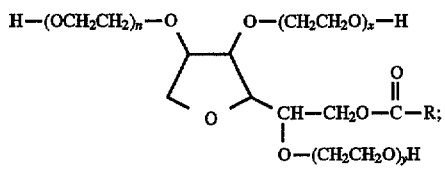

ix) alkylphenol ethoxylates of the formula

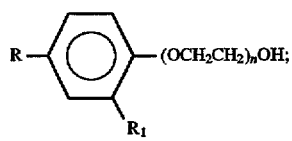

x) alcohol ethoxylates of the formula

R—O—(CH$_2$CH$_2$O)$_n$H;

xi) tristyrylphenol ethoxylates of the formula

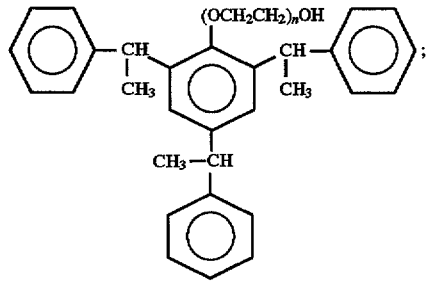

xii) mercaptan ethoxylates of the formula

R—S—(CH$_2$CH$_2$O)$_n$H;

xiii) alcohol alkoxylates of the formula

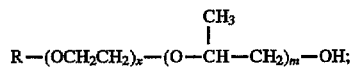

xiv) ethyleneoxide/propyleneoxide block copolymers of the formula

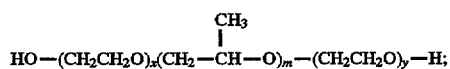

xv) copolymers of the formula

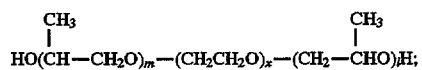

xvi) chlorine capped ethoxylates of the formula

R—(OCH$_2$CH$_2$)$_x$Cl;

xvii) tetra-functional block copolymers of the formula

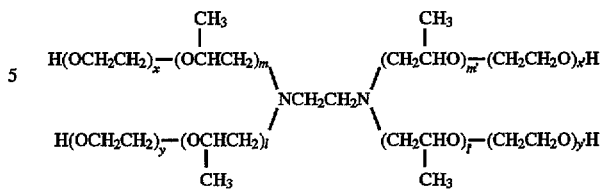

or

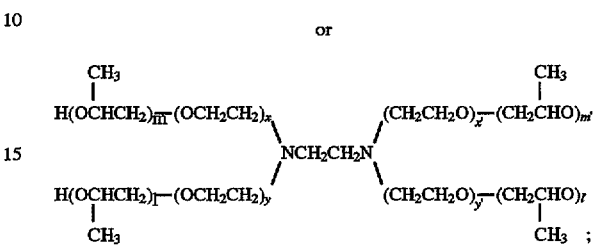

and xviii) mixtures thereof
wherein
R is a fatty alkyl group;
R$_1$ is —H or a fatty alkyl group;
x, x', y, y' and n are each independently moles of ethyleneoxide; and
m, m', l and l' are each independently moles of propyleneoxide; and
with the proviso that the surfactant composition is a solid or of a hard, non-tacky wax consistency at room temperature; such that from 70 to about 99 weight percent of said adjuvant system is said fertilizer and from 1 to 30 weight percent of said adjuvant system is the surfactant composition; all weight percents being based on the total dry bonded adjuvant system weight.

2. The method of claim 1 wherein the fertilizer is present from 70 to about 96 weight percent of the adjuvant system.

3. The method of claim 2 wherein said fertilizer is diammonium sulfate.

4. The method of claim 1 wherein said fertilizer is diammonium sulfate.

5. The dry bonded adjuvant composition produced by the process of claim 4.

6. The method of claim 1 wherein
R fatty alkyl groups are from C$_6$ to C$_{22}$;
R$_1$ is H or the fatty alkyl groups are from C$_6$ to C$_{22}$;
x, x', y, y', and n are each independently from 1 to 300; and
m, m', l, and l' are each independently from 1 to 300.

7. The method of claim 6 wherein
R is C$_8$ to C$_{18}$ alkyl;
R$_1$ is H or C$_8$ to C$_{18}$ alkyl;
x, x' y, y' and n are each independently from 1 to 200;
m, m', l, and l' are each independently from 1 to 200.

8. A method for producing a dry bonded adjuvant system comprising
a) mixing dry water-soluble nitrogen-containing fertilizer particles in a blending chamber;
b) melting a solid nonionic surfactant selected from the group consisting of i) alkanolamides of the formula

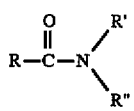

wherein R' and R" each can be —H,

—CH₂CH₂OH, or —CH₂—CH—OH;
                      |
                      CH₃ ii) ethoxylated alkanolamides of the formula

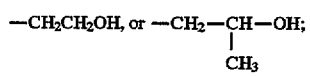

iii) ethylene bisamides of the formula

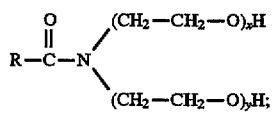

iv) fatty acid esters of the formula $$R-C(=O)-O-R_1;$$

v) glycerol esters of the formula

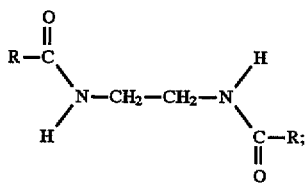

vi) ethoxylated fatty acid esters of the formula

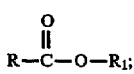

vii) sorbitan esters of the formula

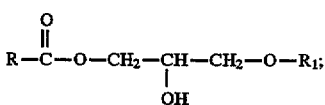

viii) ethoxylated sorbitan esters of the formula

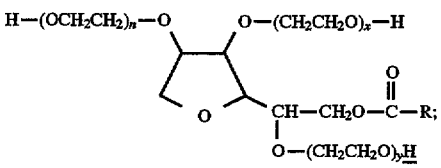

ix) alkylphenol ethoxylates of the formula

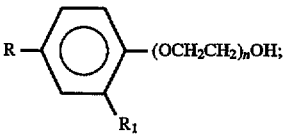

x) alcohol ethoxylates of the formula $$R-O-(CH_2CH_2O)_nH;$$

xi) tristyrylphenol ethoxylates of the formula

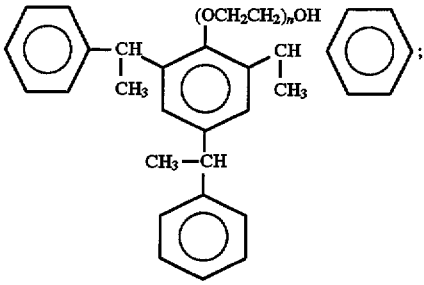

xii) mercaptan ethoxylates of the formula $$R-S-(CH_2CH_2O)_nH;$$

xiii) alcohol alkoxylates of the formula

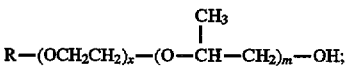

xiv) ethyleneoxide/propyleneoxide block copolymers of the formula

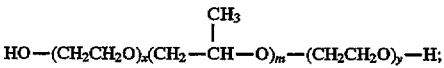

xv) copolymers of the formula

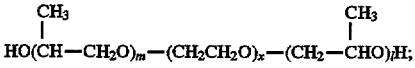

xvi) chlorine capped ethoxylates of the formula $$R-(OCH_2CH_2)_xCl;$$

xvii) tetra-functional block copolymers of the formula

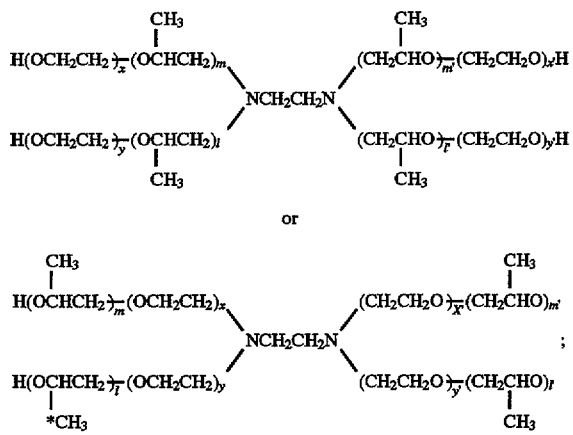

and xviii) mixtures thereof
wherein
R is a fatty alkyl group;
$R_1$ is —H or a fatty alkyl group;
x, x', y, y' and n are each independently moles of ethyleneoxide; and
m, m', l and l' are each independently moles of propyleneoxide; and
with the proviso that the surfactant composition is a solid or of a hard, non-tacky wax consistency at room temperature c) spraying the molten surfactant onto the fertilizer with continuous blending to achieve coating and granulation of the fertilizer particles; and d) cooling the coated particles wherein said fertilizer comprises from 70 to about 99 weight percent of the adjuvant system, and said surfactant composition comprises from 1 to 30 weight percent of the adjuvant system; all weight percents being based on the total adjuvant system weight.

9. The method of claim 8 wherein the fertilizer is present from 70 to about 96 weight percent based on the adjuvant system.

10. The method of claim 8 wherein
R fatty alkyl groups are from $C_6$ to $C_{22}$
$R_1$ is —H or the fatty alkyl groups are from $C_6$ to $C_{22}$;
x, x', y, y', and n are each independently 1 to 300; and
m, m', l, and l' are each independently 1 to 300.

11. The method of claim 10 wherein
R is $C_8$–$C_{18}$ alkyl;
$R_1$ is —A or $C_8$–$C_{18}$ alkyl;
x, x', y, y', and n are each independently from 1 to 200; and
m, m', l, and l' are each independently from 1 to 200.

12. The method of claim 8 wherein
i) the nonionic surfactant is melted at from about 65° C. to about 95° C.; and
ii) the cooled particles are cooled to less than about 50° C.

13. The dry bonded adjuvant composition produced by the process of claim 8.

* * * * *